June 16, 1931. J. BADER 1,809,824
POTATO CHIPPER
Filed Sept. 8, 1928
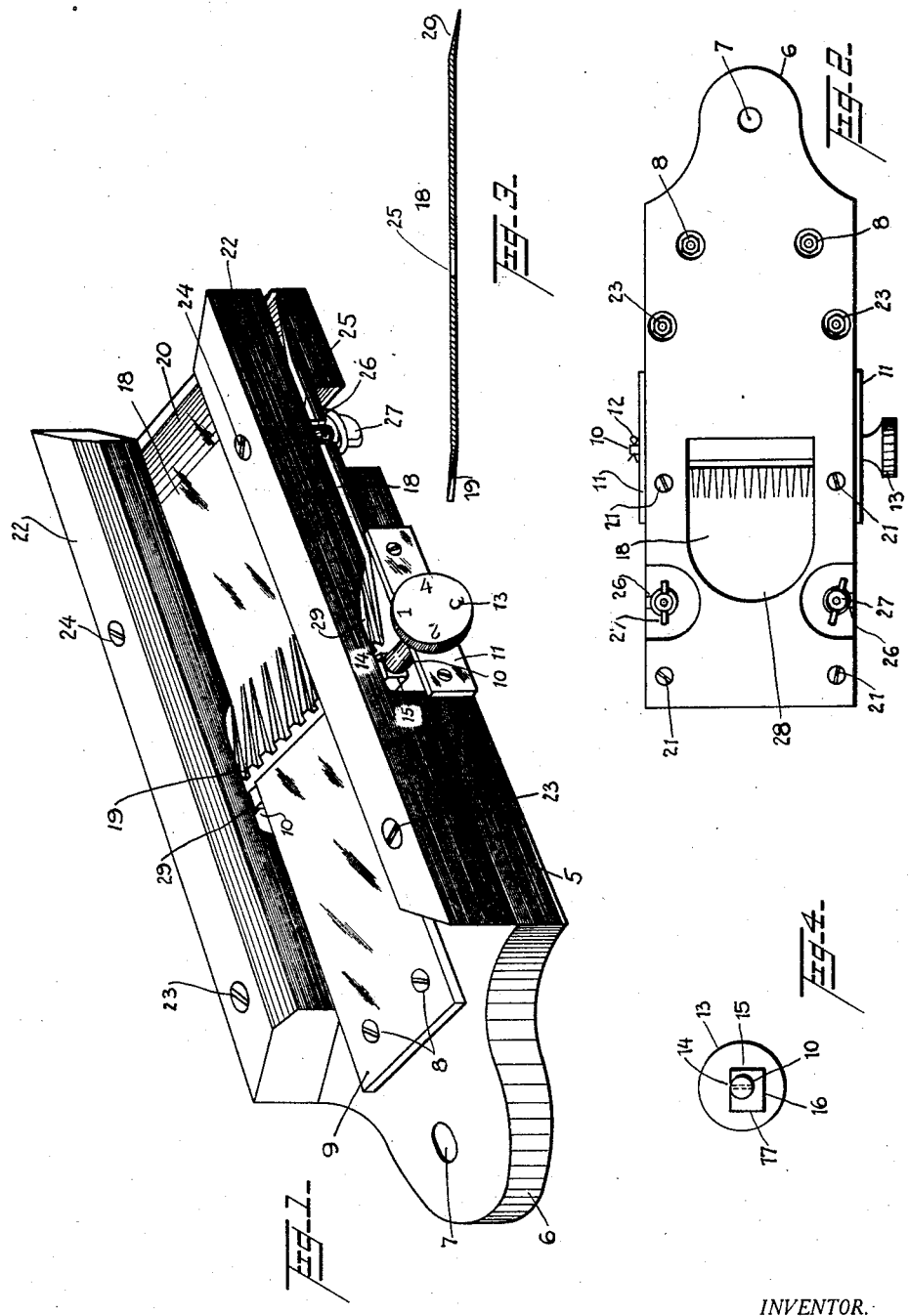
INVENTOR.
JULIEN BADER.
BY Rudolf Wildermann
his ATTORNEY.

Patented June 16, 1931

1,809,824

UNITED STATES PATENT OFFICE

JULIEN BADER, OF NEW YORK, N. Y.

POTATO-CHIPPER

Application filed September 8, 1928. Serial No. 304,630.

My invention relates to that kind of kitchen utensils which are used in the culinary arts to slice potatoes into chips of various sizes and of manifold patterns; and the objects of my invention are to provide a potato chipper which, first, is of such substantial construction as to withstand the frequent and rough use of a large cuisine or scullery, second, affords the cook means to do the slicing of potatoes most expeditiously and conveniently, third, is of such simple construction as to be easily cleaned, and fourth, without extra parts by a simple process can be adapted to the cutting of the various sizes and fancy and useful patterns known to the art, as there are "pommes soufflées", "pommes juliennes", "pommes gaufrettes", "Saratoga chips" and many more.

I attain these objects by the device illustrated in the accompanying drawings in which, Figure 1 is a perspective view of the assembled device.

Figure 2 is a bottom view of same.

Figure 3 is a side view of the knife.

Figure 4 is an end view of the adjusting shaft.

Similar numerals refer to similar parts throughout the several views.

The device is assembled on a board 5, the end 6 of which is shaped to offer a convenient grip for the hand. There is an aperture 7 which serves to hang up the device when not in use.

On the board is mounted by two screws 8 the rectangular plate 9. That plate is springy and its free end rests on the adjusting shaft 10 for the whole length of which the board 5 is cleared out. The two round ends of shaft 10 are supported by bearing plates 11 which are screwed onto both sides of the board. Since the tension of plate 9 presses down at all times upon the shaft, the round ends of the shaft do not have to be fully journaled but they rest in suitable slots, extending from the top downward in the bearing plates 11. The shaft is held in position endwise by a cotter pin 12 on one end by a knurled knob 13 on the other end. The face of the knob shows numerals 1, 2, 3 and 4, right-angularly displaced from each other.

The shaft 10 is rectangular in the center, its four sides 14, 15, 16 and 17 registering, respectively, with the numerals 1, 2, 3 and 4 on the face of the knob. In the rotation enumerated the four sides of the rectangular part of the shaft have successively increasing distances from the center of shaft 10 so that side 14 is about tangential to the round part of the shaft, side 15 is a little further away from it, the distances being still greater for sides 16 and 17.

Knife 18 is tilted upward at the end 19 at which it faces plate 9. Its other end 20 is tilted downward. It rests on the ends of four screws 21 which are inserted in the board 5 from the bottom and protrude over its top. The knife is held down by the two sides 22, which are rotatably retained on the board 5 by bolts 23. The bolts 24 in the sides 22 fit into slots 25 and 26 in the knife and in the board, respectively. Clearances are cut into the board from the bottom, corresponding to those slots and accommodating wing nuts 27 on the ends of bolts 24.

When the wing nuts are loosened up, the sides 22 can be swung away from the device around bolts 23, and the knife may be taken out and turned around, so that its end 20, extending upwards from the board, faces plate 9 in the same way in which the end 19 is facing that plate in the drawing.

The tilted end 19 of the knife has a sharp corrugated edge produced by suitable flutes pressed, milled or ground into the material. The other end 20 of the knife runs to a straight sharp knife edge. Below the knife is a clearance cut 28 in the board. There is also a clearance cut 29 in the sides, accommodating the tilted end of knife 18 and from there on to the back the bottoms of the sides are slightly cleared away, to allow clearance for the knife and space below said knife, required for adjustments of the knife. At the rear end, below the tilted end of the knife, the board is chamfered downward to give clearance for that tilted end of the knife.

The device functions as follows:

The operator grips the handle 6 and slides the potato along plate 9 against the edge of the knife and as he continues the stroke, part of the potato is cut away at the bottom, falling out below the knife through opening 28. The slices of the potato come out of the bottom, fluted corresponding to the corrugated edge of the knife.

By turning the potato through a variety of acute angles ranging up to a right angle, on each successive cutting stroke, or by holding it in the same direction all the time is one means by which the appearance of the slices can be given a great variety. But the greatest advantage is imparted to the device by the novel adjusting shaft, allowing the cutting of the slices at any thickness desired. When assembled for the first time the screws 21 on the bottom of the board are adjusted in such a way that, with the knife resting on those four screws, the bottom of the corrugated edge of the knife is slightly above the level of the top of plate 9, when the side of the square shaft corresponding to the index figure 3 on the knob is turned up. If I turn the knob to position 4, the free end of plate 9 is raised so that its top faces the corrugated edge of the knife; the plate drops below the corrugated edge when the knob is turned to position 2 and the vertical distance between the corrugated edge and the plate is still further increased when the knob is set to position 1.

In the position 1 the machine cuts heavy slices, for potatoes puffed "à la madeleine." For thinner, but similar slices the knob is set to position 2, the machine making potatoes fluted "à la Vichy." Turning the potato for successive cuts and having the knob set to position 3, slices pierced in a gated pattern are obtained, "pommes gaufrettes", "pommes frittes", sometimes termed julienne potatoes I obtain by setting 4 of the knob.

If I now turn the knife around so that the corrugated edge 19 is in the back of the machine, whereas the straight edge 20 faces plate 9, taking the previous position of the corrugated edge, I can, by corresponding adjustments of the knob obtain "plain puffed potatoes", "German fried potatoes" or "Saratoga chips."

The rectangular section of the adjusting shaft may be replaced by a triangular, pentagonal or any polygonal section, thus offering less or more positions of adjustment for other varieties of potatoes. The other parts of the machine, means for adjusting the heights, the sides, etc., may be adjusted in a variety of ways a description of which would lead too far in this specification but which, of course, all fall under the scope of my invention. Instead of having a rectangular shaft with eccentric round ends, the shaft may be round and eccentric in respect to the journaled ends, means being provided at the same time to clamp or set said shaft at any angle desired.

I claim:

1. A potato chipper of the kind described, comprising a frame, a plate and a detachable knife both mounted on the top of said frame, with one edge of said knife adjacent, opposed, and in spaced apart relation to one end of said plate, said knife having cutting edges on its opposite ends and being reversible lengthwise to present either edge in adjacent, opposed relation to said plate end, side rails mounted on the top of said frame, near the opposite edges thereof, pivoted thereto to swing transversely thereover and over said knife in a plane parallel to the plane of the top of said frame, and means to clamp the swingable ends of said side rails upon said knife, to detachably and reversibly retain said knife in operative relation to said frame and said plate end.

2. A potato chipper of the kind described, comprising a frame, a spring plate fixedly connected at one end to the top of said frame, with its opposite end free and vertically adjustable relatively to said frame top, a detachable knife normally mounted in fixed position on top of said frame and lengthwise reversible relatively thereto, having cutting edges on its opposite ends with one edge adjacent, opposed, and in spaced relation to the adjustable free end of said plate, clamping means to retain either edge of said knife in spaced, operative, position relatively to the free end of said plate, and a rotatable, polygonal sided, eccentric shaft mounted transversely in said frame, in supporting, rotatably movable engagement with the bottom face of the free end of said spring plate, adapted, by different degrees of rotation, to cause the various sides of said shaft to engage said plate and adjust the free end of said spring plate to variable, predetermined positions of vertical adjustment, relatively to the top of said frame and to the adjacent edge of said knife.

3. In a potato chipper, in combination with a frame, a plate mounted on said frame, one end of said plate being vertically adjustable in relation to said frame, a knife provided with oppositely disposed, differently patterned, alternative potato cutting edges, and clamping means adapted to fix said knife in said frame in alternative cutting position, so that one or the other knife edge faces said plate, each allowing the cutting of a differently surfaced potato chip, and so that the thickness of said chips depends on the vertical adjustment of the end of said plate.

4. In a potato chipper, the combination with a frame, a plate mounted in said frame, one end of said plate being vertically adjustable in a multiplicity of positions of predetermined height in relation to said frame, a knife provided with oppositely disposed, differently patterned, alternative potato cutting edges, and clamping means adapted to fix said knife in said frame in alternative cutting position, so that one or the other knife edge faces said plate, each allowing the cutting of a differently surfaced potato chip, and so that the thickness of said chips depends on the vertical adjustment of the end of said plate.

Signed at New York in the county of New York and State of New York this 31st day of August, A. D. 1928.

JULIEN BADER.